United States Patent [19]

Sutliff

[11] 3,920,198
[45] Nov. 18, 1975

[54] FILM CARTRIDGE
[75] Inventor: Robert C. Sutliff, Rochester, N.Y.
[73] Assignee: Eastman Kodak Company, Rochester, N.Y.
[22] Filed: Apr. 30, 1974
[21] Appl. No.: 465,456

[52] U.S. Cl. ................................ 242/194; 352/72
[51] Int. Cl.² ................ G03B 1/04; G11B 15/32
[58] Field of Search ............ 242/71.2, 194; 352/72, 352/78 R, 156

[56] References Cited
UNITED STATES PATENTS

| | | | |
|---|---|---|---|
| 3,599,894 | 8/1971 | Edwards | 242/194 |
| 3,623,679 | 11/1971 | Neudecker et al. | 242/194 |
| 3,831,881 | 8/1974 | Tucker | 242/194 |

*Primary Examiner*—Leonard D. Christian
*Attorney, Agent, or Firm*—G. H. Childress

[57] ABSTRACT

A film cartridge loaded with a roll of motion picture film having a magnetic stripe on one surface of the film tends to clockspring in a radial direction and undergo displacement of some convolutions of the film in a direction parallel to the axis of the film roll, especially when subjected to shaking or impacts during handling of the cartridge prior to use in a camera. When this occurs, friction between a displaced convolution and the adjacent convolutions of the film effectively prevents return of the stepped convolution to its original position. Subsequently, when film is to be pulled from the supply roll during operation of a camera or similar device in which the cartridge is positioned, the stepped convolutions can contact a wall of the cartridge defining the supply chamber in the cartridge and produce a frictional force that opposes normal unwinding of the film. This can result in improperly exposed film. This film stepping problem can be avoided by attaching or cinching the film to a supply ring as well as to the take-up core, and locking both in place by means of a control member which prevents any rotational movement prior to insertion of the film cartridge into a camera. The control member is moved axially to unlock the supply ring and take-up core when the cartridge is inserted into the camera.

9 Claims, 6 Drawing Figures

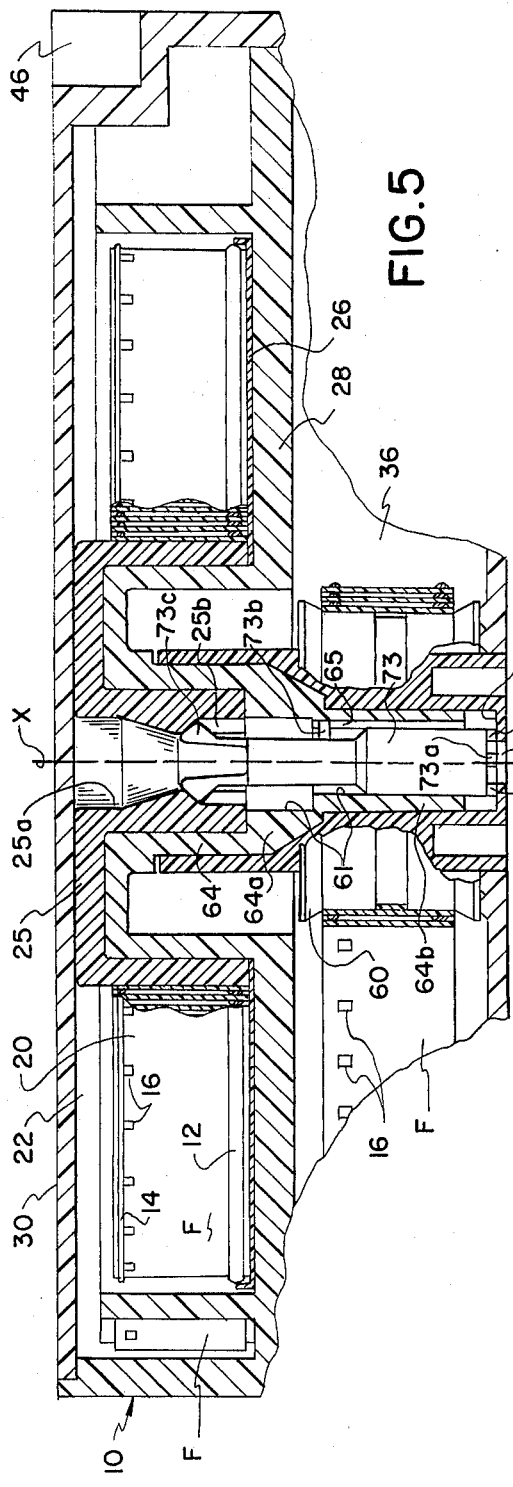
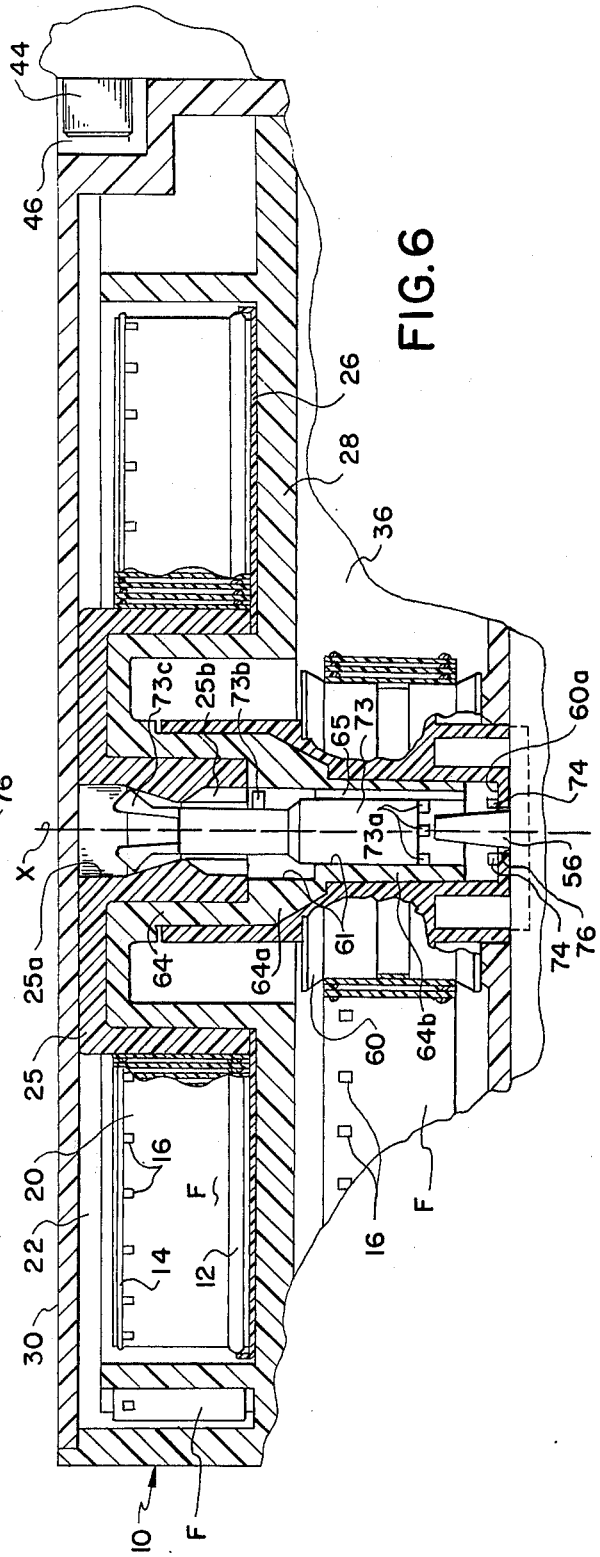

FILM CARTRIDGE

BACKGROUND OF THE INVENTION

1. Field of the Invention

This invention relates to film cartridges of the type used in motion picture cameras and the like and, more particularly, to such a film cartridge adapted to receive a roll of motion picture film having a magnetic sound stripe on one surface of the film which projects from such surface.

2. Description of the Prior Art

Commonly assigned U.S. Pat. No. 3,208,686 entitled Film Cartridge, issued Sept. 28, 1965 in the name of E. A. Edwards et al, discloses a "super 8" film cartridge for motion picture cameras or the like wherein a coreless roll of motion picture film is positioned around (but not attached to) a stationary post in a supply chamber of the cartridge and is withdrawn from the chamber along a film path past an exposure aperture and is then wound onto a takeup core in a takeup chamber of the cartridge, the supply and takeup chambers being in substantially parallel planes and being co-axially disposed with respect to each other. As is well known in the art, the film supply roll in such a cartridge is coreless and therefore is subject to clockspringing, i.e., successive convolutions of the film roll may be displaced radially outwardly relative to the central axis of the roll due to the tendency of a coiled, unsecured film supply roll to unwind. It also is known to modify such cartridges to provide for recording of sound onto the film in the cartridge simultaneous with exposure of the various film frames to scene light. In this regard, reference is made to U.S. Pat. No. 3,442,580 issued May 6, 1969 in the name of A. Winkler. When such cartridges are loaded with film containing a magnetic stripe for recording of sound, the magnetic stripe typically is placed along one side edge of one surface of the film and adjacent the central area of the film where photographic emulsion on the other surface is exposed to scene light. A balance stripe is typically provided on the other side edge of that one surface of the film beside perforations in the film. Both the recording stripe and the balance stripe project from the surface of the film. Because the walls defining these supply chambers in the cartridge are spaced apart by a distance somewhat greater than the width of the film roll to minimize frictional contact therebetween, the various film convolutions can step (move axially) in a random manner by a distance which allows a stepped convolution to overlap one of the stripes (e.g., the sound stripe) and contact one wall of the supply chamber, particularly where the film has clocksprung as a result of handling during packaging, shipping, etc. As noted before, this results in excessive frictional contact by the supply roll of film and at least one wall of the film supply chamber, and may result in unsatisfactory exposure of film in a camera. Attempts to force the stepped convolutions to return to their original position by surface formations on the walls of the cartridge chamber generally are not satisfactory due to the frictional contact between the stepped convolutions of the film and the adjacent convolutions.

SUMMARY OF THE INVENTION

It is an object of the present invention to provide a film cartridge which overcomes the difficulties encountered as a result of stepping of film in a supply roll of film in a film cartridge.

Another object of the invention is to minimize the tendency of the film to become stepped by preventing the film from clockspringing.

A still further object of the invention is to prevent the film from becoming clocksprung and stepped by attaching the film to both a supply ring and a take-up core, both of which are mechanically prevented from rotating prior to insertion of the cartridge in a camera or similar device.

In accordance with the present invention, a film cartridge having a rotatable supply ring located in a supply chamber and a rotatable take-up core located in a take-up chamber co-axially with the supply ring is provided with a means for preventing the rotation of either until the cartridge is inserted into a camera. Initially, prior to insertion of the cartridge into a camera, the supply ring and take-up core are locked in position and unable to rotate. Upon insertion of the cartridge into a camera, the means for locking the supply ring and take-up core in position is released, permitting free rotation.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 5 is an enlarged fragmentary transverse cross-section view through a film-cartridge of the invention showing the control member in its initial locked position; and FIG. 6 is a view similar to FIG. 5 but illustrating the cartridge after insertion into a camera or the like, where the control member has been disengaged by a pin mounted in the camera to permit simultaneous rotation of the supply ring and take-up core.

DESCRIPTION OF THE PREFERRED EMBODIMENTS

Because photographic apparatus is well known, the present description will be directed in particular to elements forming part of, or cooperating more directly with, the present invention; apparatus not specifically shown or described herein are understood to be selectable from those known in the art.

Figure 2:
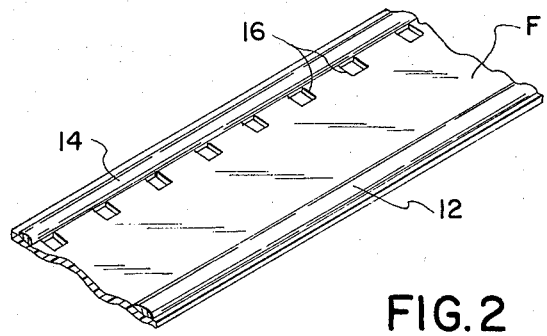
FIG. 2 is an enlarged perspective view of a portion of a film strip of the type that can be loaded in the cartridge shown in FIG. 1.

Referring now to the drawings in detail, a film cartridge according to the present invention is generally designated 10 and is adapted to be loaded with film F. As best shown in the FIGS. 2 and 3, the film F may be a film strip having a stripe 12 of magnetic recording material along one side edge of one surface of the film and a balance stripe 14 along the other side edge of the same surface of the film. The balance stripe is located adjacent to a plurality of perforations 16 in the film strip, and the light sensitive emulsion on the film typically is located on the opposite (lower) surface of the film.

Figure 3:
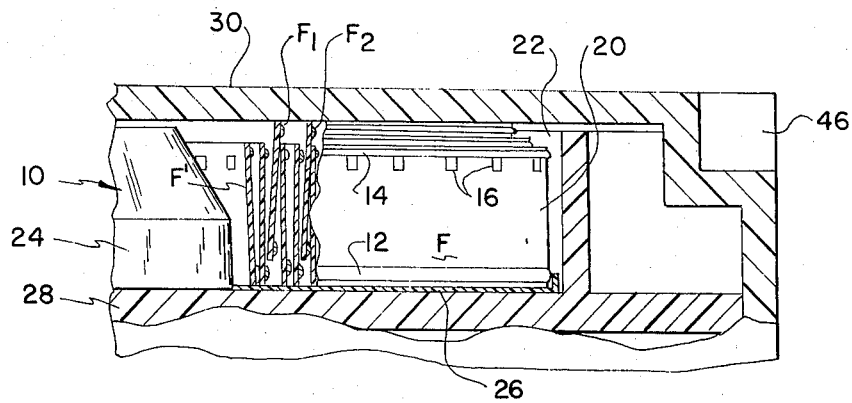
FIG. 3 is an enlarged fragmentary view of a portion of the supply side of a film cartridge showing certain convolutions of film stepped in a manner which is considered undesirable.

As noted earlier, sound film of the type shown in FIG. 2, when loaded in a super 8 film cartridge as generally disclosed in the beforementioned Edwards et al patent, tends to clockspring, and this allows the convolutions of the film to step randomly. In part, the clockspringing of the supply roll of film in the cartridge, and thus the resulting stepping of the various convolutions, occurs because the film in the supply chamber of the Edwards et al cartridge is a "coreless" roll of film, i.e., it is not attached to a reel, core or the like and therefore the inner convolution of film is not held stationary. FIG. 3 illustrates the stepped condition that can result from loading of film of the type shown in FIG. 2 in a cartridge as disclosed in the Edwards et al patent. Thus FIG. 3 illustrates a coreless roll 20 of film F located in a supply chamber 22 of the film cartridge. The inner end F' of the film is unattached and loosely positioned around a stationary supply post 24. The film convolutions designated F1 and F2 have become stepped and the lower portions thereof frictionally contact the sound stripe 12 of the film convolutions radially inwardly of the convolutions F1 and F2. The film roll 20 rests on an antifriction disc 26 which may be of the type disclosed in the commonly assigned U.S. Pat. No. 3,208,685 issued Sept. 28, 1965 in the names of E. A. Edwards and A. J. Tucker and entitled Anti-Friction Disk for Strip Material Cartridge. Because of the antifriction disc, the film roll can rotate relatively freely with respect to the bottom or inner wall 28 of the supply chamber in the cartridge. However, the stepped convolutions of film F1 and F2 contact the inner surface of the upper wall or cover 30 of the supply chamber and produce a friction force when the supply roll is rotated (as is necessary during advancement of film in a camera). This force increases the load required for proper advancement of film and, as noted earlier, can result in improper exposure of film.

To the extent the cartridge 10 incorporates the same or similar structures as described in connection with FIG. 3, the same reference numerals have been used to designate the same parts of the cartridge 10. Referring now to FIGS. 1 and 4–7, the sound cartridge 10 illustrated in the drawings includes a sound aperture 32 which opens to the bottom and backside of the cartridge (as viewed in FIG. 1) and is adapted to receive certain elements of sound apparatus in a camera. Film in supply chamber 22 is unwound in a counterclockwise direction and threaded past an exposure aperture 34 in the cartridge for exposure to scene light in a camera. The film is then advanced through the sound aperture 32 in the cartridge for recording of sound onto the film. Then the film is fed into a takeup chamber 36 located below wall 28 in a plane parallel to the plane of the supply chamber. As is well known in the art, film in the take-up chamber can be wound onto a core 60 that is substantially coaxial with axis X of the supply chamber. Take-up chamber 36 and the core therein are disclosed in more detail in the beforementioned Edwards et al patent.

Figure 1:
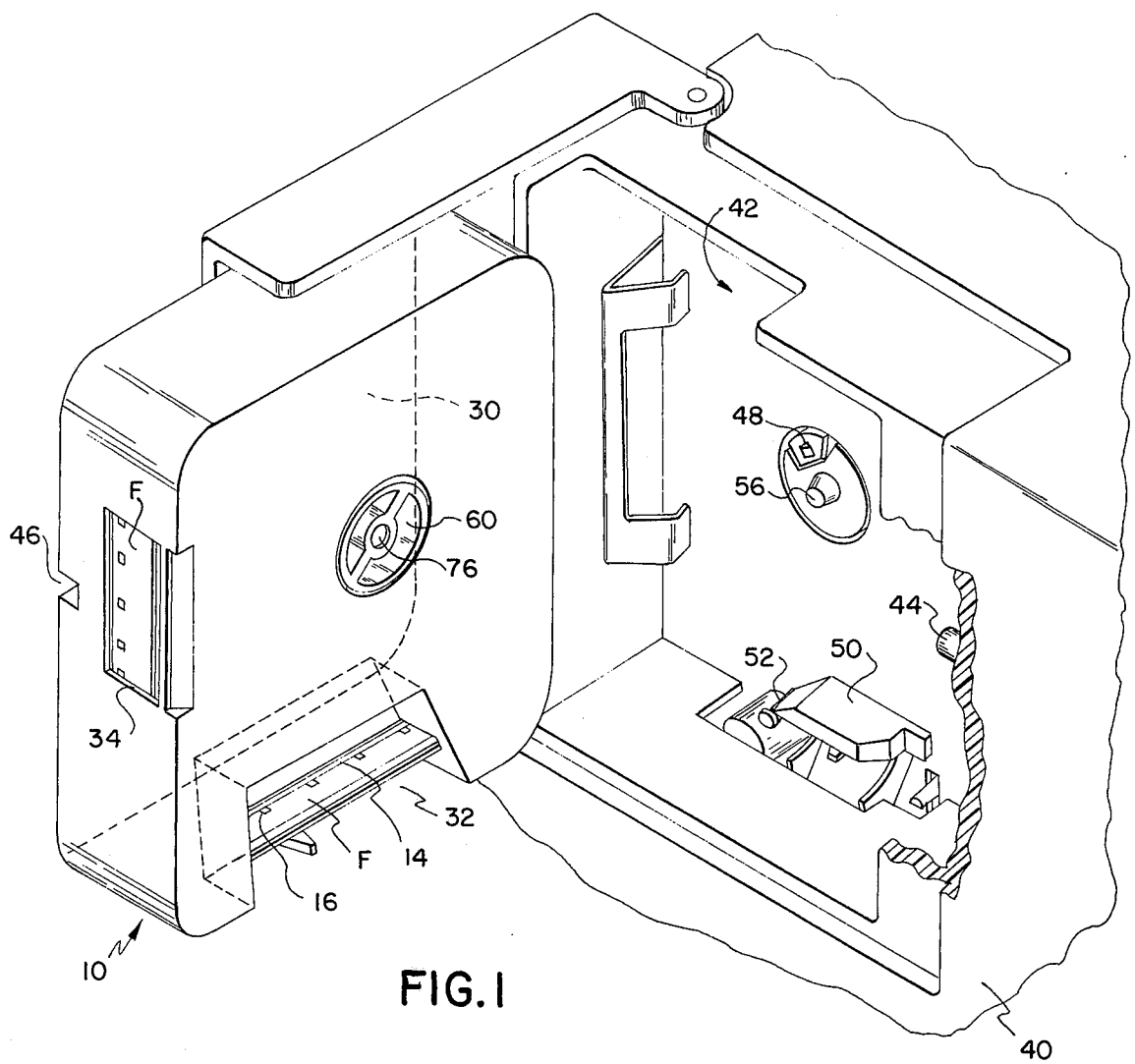
FIG. 1 is a perspective view, partially broken away, illustrating a cartridge constructed in accordance with the present invention and a portion of a motion picture camera or the like adapted to receive the cartridge.

The cartridge 10 is adapted to be positioned in a motion picture camera or the like, a portion of which is generally designated 40 in FIG. 1. Camera 40 comprises a cartridge chamber or compartment 42 having a locating pin 44 on one wall of the chamber which is adapted to be received by a locating notch 46 in the cartridge for locating the cartridge with respect to chamber 42. A drive member 48 projects through the back wall of the cartridge chamber and is engageable with the takeup core 60 of the cartridge in a conventional manner. The member 48 is rotated in an annular path by a friction drive for rotating the cartridge core in a takeup direction during operation of the camera. A shroud 50 and certain elements of sound apparatus generally designated 52 are at least partially received in the sound aperture 32 of the cartridge. Apparatus 52 is effective to record sound on the magnetic stripe 12 of the film simultaneous with exposure of film through exposure aperture 34. The cartridge is urged toward the right (toward locating pin 44) by suitable spring means 54 in the cartridge chamber. A pin 56 can be provided to effect movement in an axial direction of a member located within the film cartridge.

In accordance with the present invention, means is provided for preventing the rotation of both a supply ring 25, to which one end of a roll of film is attached or cinched, and take-up core 60, to which the other end of the roll of film is attached or cinched, prior to insertion of the film cartridge into camera 40. In this initial locking position the roll of film is held taut and prevented from clockspringing and stepping.

Supply ring 25 is a generally cylindrical member located radially inwardly of the roll of film in the supply chamber and includes a central opening 25a whose axis is coincident with axis X of the film cartridge. A plurality of grooves 25b are formed on the surface defining opening 25a of the supply ring extending parallel to axis X. The roll of film can be secured to supply ring 25 by tightly cinching the film end onto the ring during spooling of the film, or alternatively by inserting the film end through a slot (not shown) in the supply ring.

The aforementioned means for preventing rotation of a tautly held roll of film prior to insertion of the film cartridge into a camera includes a control member 73 adapted to be moved within the film cartridge between a first or locking position (FIG. 5) and a second or release position (FIG. 6). Control member 73 is generally of a cylindrical configuration and extends along axis X of the film cartridge. The supply chamber end portion of control member 73 comprises a plurality of flexible fingers 73c, whereas the takeup chamber end portion thereof comprises a plurality of teeth 73a. Extending in a perpendicular direction to axis X from the mid-portion of control member 73 is a key 73b.

Control member 73 is positioned in the film cartridge within a generally cylindrical recess 61 whose axis is also substantially coaxial with axis X of the film cartridge. As illustrated, the side walls of recess 61 are defined by the surface defining opening 25a of supply ring 25 and the surfaces of cylindrical segments 64a and 64b of a cylindrical portion 64 of film cartridge wall 28. The supply ring 25 rotates on cylindrical portion 64 of the film cartridge wall 28. The ends of recess 61 are bounded by cartridge cover 30 at the supply chamber end, and, as can best be seen in FIG. 4, by a lower end portion 60a of take-up core 60 at the take-up core end. An opening 76 is provided in end portion 60a, as shown.

Figure 4:
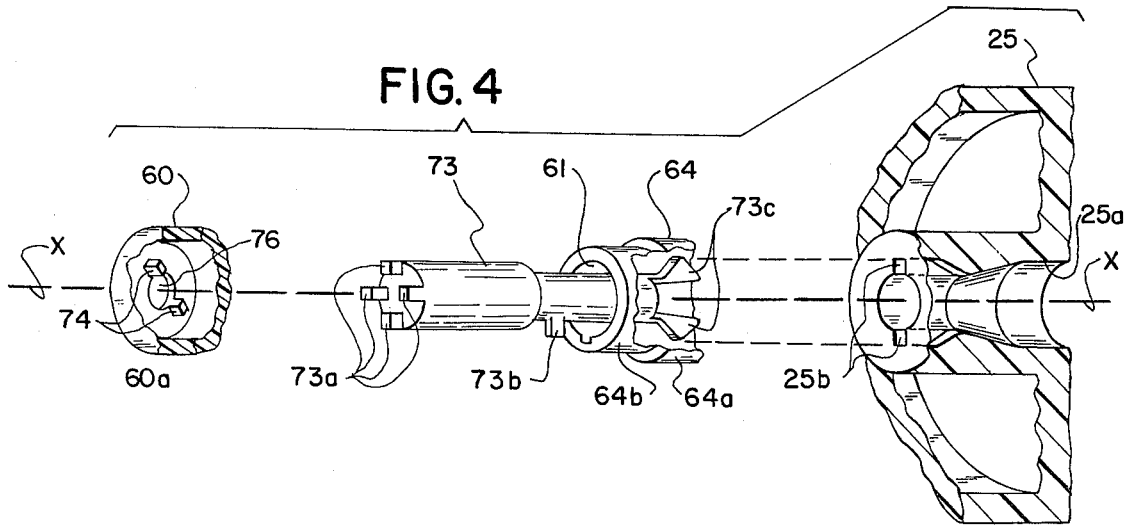
FIG. 4 is a fragmentary exploded view illustrating portions of the control member of the invention.

With control member 73 in the first, locking position, as shown in FIG. 5, rotational movement of control member 73, supply ring 25, and take-up core 60 are prevented. Referring to FIGS. 4 and 5, it is seen that in the first locking position key 73b of control member 73 projects into a channel keyway 65 formed in the surface of cylindrical wall segment 64a. Therefore rotational movement of control member 73 is impossible in the first, locking position. In addition, the supply ring 25 and the take-up core 60 are releasably locked to control member 73, so that rotational movement of the supply ring 25 and the take-up core 60 are prevented while control member 73 is in the first, locking position. More particularly, in the first locking position of control member 73, control member fingers 73c project into the grooves 25b formed in the surface of opening 25a of supply ring 25. Thus since the control member 73 is unable to be rotated supply ring 25 likewise is locked in position. Similarly, in the first, locking position of control member 73, the teeth 73a on the take-up core end of control member 73 interlock with teeth 74 projecting inwardly from take-up core 60, thereby locking take-up core 60 in position also. Thus, a roll of film connected at one end to the supply ring 25 and at the other end to the take-up core 60, and held taut therebetween and will not be subject to clock-springing and stepping with the supply ring 25 and take-up core 60 locked in position as described.

Referring now to FIG. 6, control member 73 has been shifted in an axial direction by pin 56 to a second, release position upon being inserted into a camera. In this second position control member fingers 73c are not in contact with supply ring 25, key 73b is not restrained by keyway 65, and control member teeth 73a are separated from and not interlocked with take-up core teeth 74. Therefore in this second position control member 73 is released from contact with supply ring 25 and take-up core 60, and free rotation of both of the latter is possible.

The invention has been described in detail with particular reference to preferred embodiments thereof, but it will be understood that variations and modifications can be effected within the spirit and scope of the invention.

What is claimed is:

1. In a film cartridge including a supply ring in a supply chamber and a take-up core in a take-up chamber for use with a roll of film having a tendency to become stepped in the axial direction, the improvement comprising:
   a control member which is axially moveable from a first, locking position in which said member prevents rotational movement of both the supply ring and the take-up core to a second, release position in which said control member permits rotation of both the supply ring and the take-up core, responsive to the film cartridge being inserted into a camera.

2. A film cartridge as in claim 1 wherein said control member comprises a first means for preventing rotational movement of said control member in said locking position and for permitting rotational movement of said control member in said release position.

3. A film cartridge as in claim 2 wherein said control member further comprises a second means for preventing rotation of the supply ring in said locking position and for permitting rotation of the supply ring in said release position.

4. A film cartridge as in claim 2 wherein said control member further comprises a further means for preventing rotation of the take-up core in said locking position and for permitting rotation of the take-up core in said release position.

5. A film cartridge as in claim 2 wherein said first means comprises a key projecting from the mid-portion of said control member which, in said locking position, engages in a keyway forming a portion of an interior wall of the cartridge and which, in said release position, is disengaged from said keyway.

6. A film cartridge as in claim 3 wherein said second means comprises a plurality of flexible fingers located on the supply chamber end of said control member, which, in said locking position, engage with grooves formed in a central opening in the supply ring, and which, in said release position are disengaged from said grooves.

7. A film cartridge as in claim 4 wherein said further means comprises a plurality of projecting teeth on the take-up core end of said control member which, in said locking position, interlock with a further plurality of teeth projecting from the take-up core, and which, in said release position are disengaged from said further plurality of teeth.

8. In combination, a film cartridge and a camera comprising a film cartridge chamber for receiving said film cartridge, said film cartridge including a supply chamber, a take-up chamber, a supply ring located in said supply chamber, a take-up core located in said take-up chamber and a control member axially moveable from a first, locking position in which said member prevents rotational movement of both said supply ring and said take-up core to a second, release position in which said control member permits rotation of both the supply ring and the take-up core, responsive to the film cartridge being inserted into said camera, said film cartridge chamber including a means for causing axial displacement of said control member from said locking position to said release position.

9. A film cartridge chamber as in claim 8 wherein said means for causing displacement of said control member comprises a pin located within said chamber which enters into an opening in the take-up core and causes axial displacement of said control member responsive to the insertion of the film cartridge into the camera.

* * * * *